United States Patent [19]

Yamamura

[11] Patent Number: 4,897,097

[45] Date of Patent: Jan. 30, 1990

[54] AIR CLEANER FOR INTERNAL COMBUSTION ENGINE

[75] Inventor: Kazuhiro Yamamura, Yokohama, Japan

[73] Assignee: Nissan Motor Co., Ltd., Japan

[21] Appl. No.: 203,887

[22] Filed: Jun. 8, 1988

[30] Foreign Application Priority Data

Jun. 9, 1987 [JP] Japan ................... 62-143495

[51] Int. Cl.$^4$ .............................................. B01D 46/00
[52] U.S. Cl. ........................................ 55/419; 55/484; 55/521; 123/198 E
[58] Field of Search ................. 55/419, 484, 497, 499, 55/521; 123/198 E

[56] References Cited

U.S. PATENT DOCUMENTS 4,548,166 10/1985 Gest ........................ 55/484

FOREIGN PATENT DOCUMENTS 59-103856 7/1984 Japan .
60-77764 5/1985 Japan .

Primary Examiner—Bernard Nozick
Attorney, Agent, or Firm—Leydig, Voit & Mayer

[57] ABSTRACT

Two flat filter elements are disposed in a casing in such a manner that they are inclined to each other and arranged symmetrical with respect to a middle portion of the casing. With this, two dust side chambers are defined in the casing at the lower sides of the filter elements, to which members air inlet openings formed in side walls of the casing are exposed respectively. A cover is disposed on the casing to define at the upper sides of the two filter elements a common clean side chamber to which an air outlet opening formed in the cover is exposed. The cover is formed with two substantially identical air flow passages which independently extend from the respective filter elements to the air outlet opening of the cover.

17 Claims, 10 Drawing Sheets

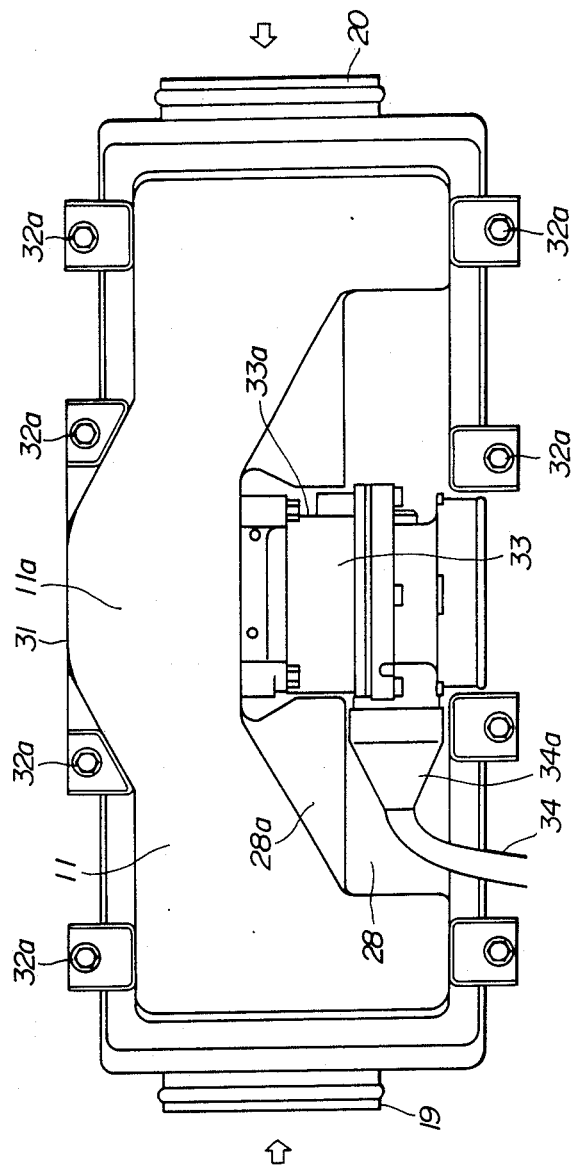

AIR CLEANER FOR INTERNAL COMBUSTION ENGINE

BACKGROUND OF THE INVENTION

1. Field of the Invention

The present invention relates in general to an air cleaner for cleaning the air fed to an internal combustion engine, and more particularly to an air cleaner of a type which uses a flat filter element.

2. Description of the Prior Art

Hitherto, various types of air cleaners have been proposed and put into practical use particularly in the field of internal combustion engines for motor vehicles.

One of the conventional air cleaners hitherto proposed is shown in FIG. 13 of the accompanying drawings. The air cleaner comprises a casing having air inlet and outlet tubes 3 and 5 secured thereto, and a flat paper filter element 2 set in the casing 1 to partition the interior of the casing 1 into a dust side chamber 4 to which the air inlet tube 3 is exposed and a clean side chamber 6 to which the air outlet tube 5 is exposed. In the illustrated conventional air cleaner, the filter element 2 is somewhat inclined with respect to the casing 1 for the purpose of increasing the filtration area of the filter element 2 and thus increasing the filtration capacity of the air cleaner. The air cleaners of this type are described in Japanese Utility Model First Provisional Publications Nos. 59-103856 and 60-77764.

However, due to inherency in construction, the air cleaners of this conventional type have the following drawbacks. That is, when increase in the filtration capacity is needed, a correspondingly larger filter element must be prepared for the air cleaner casing 1. However, this causes directly an increase in size of the casing 1. As is known, bulky construction of the air cleaner is disadvantageous in view of the jam-packed engine room of the latest motor vehicle. Furthermore, usage of a larger filter element tends to produce an undesirable vibration thereof in the casing 1 during running of the associated motor vehicle, which causes a generation of undesirable noise from the air cleaner.

SUMMARY OF THE INVENTION

Therefore, it is an object of the present invention to provide an air cleaner which is free of the above-mentioned drawbacks.

According to the present invention, there is provided an air cleaner which has two flat paper filter elements for increasing a filtration capacity irrespective of compactness in construction.

According to the present invention, there is provided an air cleaner which comprises a casing including first and second receptacle portions which are symmetrically arranged with respect to a center portion of the casing, each receptacle portion including an air inlet opening and a holding portion, the holding portions being inclined to one another to form a generally V-shaped recessed portion of the casing; first and second filter elements respectively held by the holding portions of the first and second receptacle portions, so that first and second dust side chambers are defined at one side of the first and second filter elements, respectively, in the casing, to which the air inlet openings of the first and second receptacle portions are exposed respectively, a cover having a protruding portion which overlies the filter elements and the V-shaped recessed portion of the casing and in which an air outlet opening is formed, the cover being sealingly disposed on the casing in such a manner that a common clean side chamber is defined at the other sides of the first and second filter elements, to which said air outlet opening is exposed; and structure means defining in the cover two substantially identical air flow passages which extend from the respective filter elements to the air outlet opening of the cover.

According to the present invention, there is further provided an air cleaner which comprises casing, first and second filter elements, and a cover. The casing includes first and second receptacle portions which are symmetrically arranged with respect to a center portion of the casing. Each receptacle portion includes an air inlet opening and a bottom and the two receptacle portions are inclined to one another to form a generally V-shaped recessed portion of the casing. The first and second filter elements are respectively held in the first and second receptacle portions of the casing in such a manner that first and second dust side chambers are defined in the casing at one side of each of the first and second filter elements. The air inlet openings in the first and second receptacle portions open into the dust side chambers. The cover is sealingly disposed on the casing in such a manner that a common clean side chamber is defined at the other side of each of the first and second filter elements. The cover is formed with a protruding portion which is shaped to correspond with the V-shaped recessed portion of the casing. The cover is also formed with a wall which forms part of the protruding portion, the wall being formed with an air outlet opening which communicates the clean side chamber with the outside of said air cleaner. The axis of each air inlet opening is substantially perpendicular to that of the air outlet opening. The air cleaner further comprises a structure which defines two substantially equal air flow passages in the clean side chamber. The air flow passages extend from the respective filter elements to the air outlet opening of the cover.

BRIEF DESCRIPTION OF THE DRAWINGS

FIG. 5 is a view similar to FIG. 2, but showing a condition wherein an air flow meter is mounted on the air cleaner;

DETAILED DESCRIPTION OF THE INVENTION

In the following description, the terms "left", "right", "front", "rear", "upper", "lower" and the like are to be understood with respect the drawings on which the air cleaner is illustrated.

Referring to FIGS. 1 to 4 of the accompanying drawings, there is shown an air cleaner of a first embodiment of the present invention. As is seen from FIGS. 1, 2 and 3, the air cleaner has a symmetrized construction.

Figure 1:
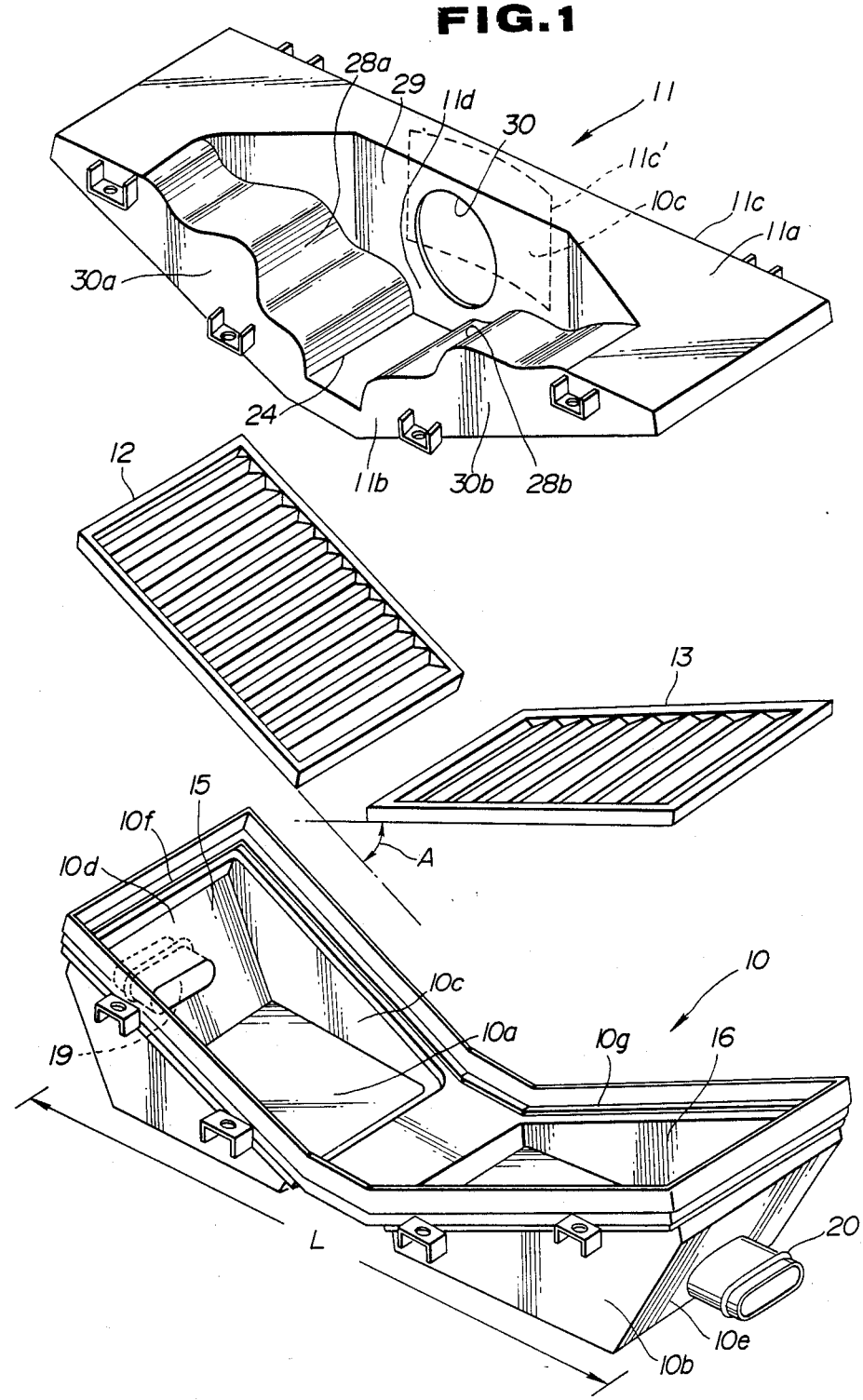
FIG. 1 is an exploded view of an air cleaner of a first embodiment of the present invention.

As is best seen from FIG. 1, the air cleaner comprises a casing 10 of molded plastic, two flat rectangular paper filter elements 12 and 13 detachably set in the casing 10 and a cover 11 of molded plastic detachably disposed on an open side of the casing 10.

The casing 10 comprises a generally rectangular bottom wall 10a, butterfly-like front and rear walls 10b and 10c, and rectangular left and right walls 10d and 10e which are united to form a receptacle the depth of which generally increases as the distance from the middle portion increases, as is seen from FIG. 1. The casing 10 thus has a generally V-concaved upper opening which consists of two mutually inclined portions (no numerals). The left and right walls 10d and 10e are respectively formed with first and second air inlet pipes 19 and 20 the interiors of which are communicated with the interior of the casing 10.

The casing 10 is further formed along the periphery of the V-concaved upper opening thereof with rectangularly extending flanges or seat portions 10f and 10g on which the filter elements 12 and 13 are respectively seated through known sealing members (no numerals). A plurality of apertured lugs (no numerals) are integrally connected to the outer peripheral portion of the mouth portion of the casing 10. As is seen from FIGS. 1 and 3, the paper filter elements 12 and 13 are of an accordian pleated type.

With the provision of these filter elements 12 and 13, there are defined in the casing 10 first and second dust side chambers 15 and 16 (see FIG. 3) to which the first and second air inlet tubes 19 and 20 are exposed respectively.

Figure 2:
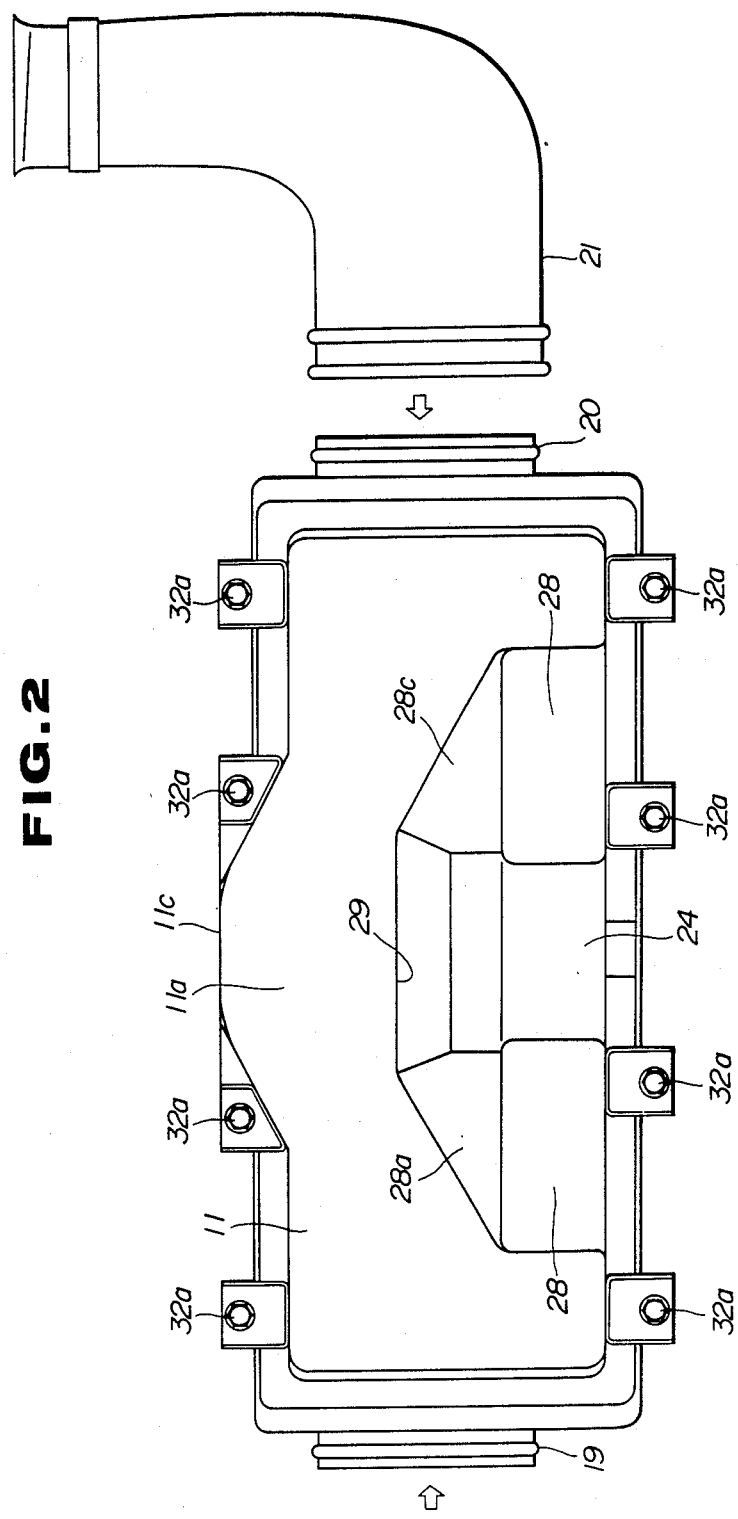
FIG. 2 is a plan view of the air cleaner of the first embodiment in an assembled condition.
Figure 3:
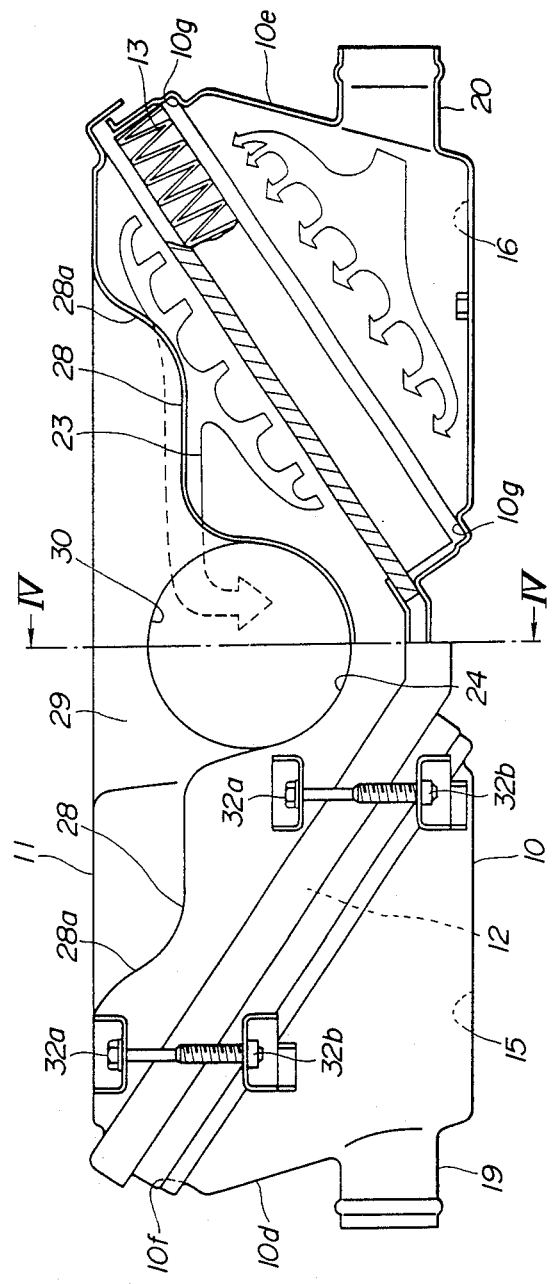
FIG. 3 is a partially cut front view of the air cleaner of the first embodiment.
Figure 4:
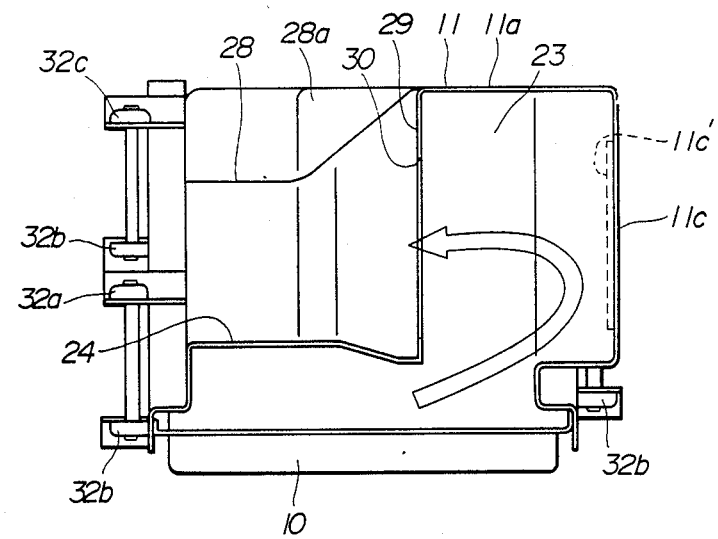
FIG. 4 is a sectional view taken along the line IV—IV of FIG. 3.

As is seen from FIG. 2, air inlet ducts 21 (only one is shown) are connected to the air inlet pipes 20 and 19 respectively.

Referring back to FIG. 1, the cover 11 comprises an upper base portion 11a, a generally triangular rear wall 11c and an inwardly depressed front wall 11b which are integrally connected. The rear wall 11c extends downward from a rear edge of the upper base portion 11a. The front wall 11b comprises an innermost vertical wall 29 and stepped side walls 28a and 28b and outermost vertical walls 30a and 30b. The innermost vertical wall 28 and the stepped side walls 28a and 28b thus define a recess 11d having a groove 24 merged therewith.

The innermost vertical wall 29 is formed with a circular opening 30 which serves as an air outlet opening as will be clarified hereinafter.

The cover 11 is integrally formed at the outer sides thereof with a plurality of apertured lugs (no numerals). These lugs are mated with the lugs of the casing 10 when the cover 11 is properly set on the casing 10. A suitable number of bolts 32a and nuts 32b are incorporated with the mated lugs for joining the casing 10 and the cover 11 together.

When thus the cover 11 is properly mounted on the casing 10, there is defined above the filter elements 12 and 13 an enlarged clean side chamber 23 (see FIG. 3 or FIG. 4) to which the air outlet opening 30 is exposed. As is understood from FIGS. 1 and 4, the rear wall 11c of the cover 11 is formed with a smoothly concaved inside surface 11c' for smoothly guiding the cleaned air from the filter elements 12 and 13 toward the air outlet opening 30.

Upon assembly, the cover 11 is fastened to the casing 10 by means of the bolts 32a and nuts 32b, having the filter elements 12 and 13 properly set in the casing 10.

In operation, air is introduced into the first and second dust side chambers 15 and 16 through the first and second air inlet pipes 19 and 20. It is to be noted that the manner in which the air flows in the air cleaner is shown by thick arrows in FIGS. 3 and 4. The air is then introduced into the common clean side chamber 23 through the respective filter elements 12 and 13. During this, dusts in the air are trapped by the filter elements 12 and 13. The air thus cleaned is then smoothly directed toward the air outlet opening 30 by the concaved inside surface 11c' and discharged from the opening 30 to be fed into an associated engine.

The air cleaner having the above-mentioned construction has the following advantages.

First, since the two filter elements 12 and 13 are arranged to incline to each other, the air cleaner assembly can be constructed compact in size. Theoretically, the longitudinal length "L" (see FIG. 1) of the air cleaner assembly can be reduced by a degree corresponding to the angle "A" which the two filter elements 12 and 13 define therebetween.

Second, usage of a smaller-sized filter element 12 or 13 brings about a stable getting of itself in the casing 10 thereby suppressing or at least minimizing the undesirable vibration thereof.

Third, because of provision of the smoothly concaved inner surface 11c' in the clean side chamber 23, the cleaned air from the filter elements 12 and 13 is smoothly curved and directed toward the air outlet opening 30. The symmetrical construction of the clean side chamber 23 with respect to the air outlet opening 30 promotes the smooth flowing of the air toward the opening 30. In fact, the air flowing is carried out without generation of vortexes.

Figure 7:
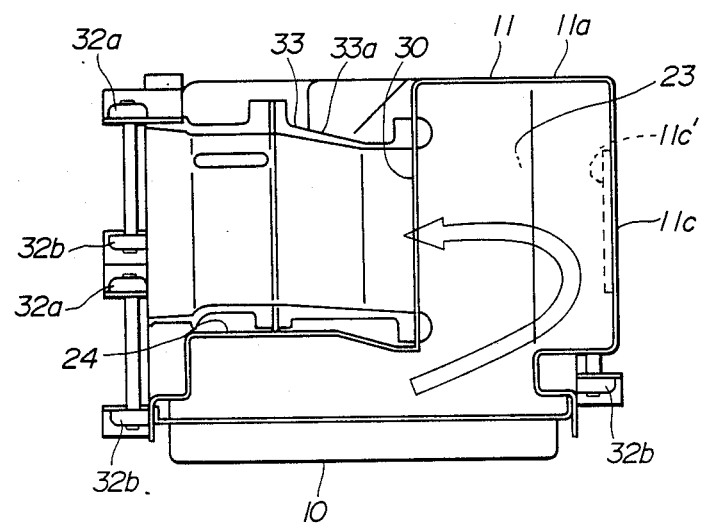
FIG. 7 is a sectional view taken along the line VII—VII of FIG. 6.
Figure 6:
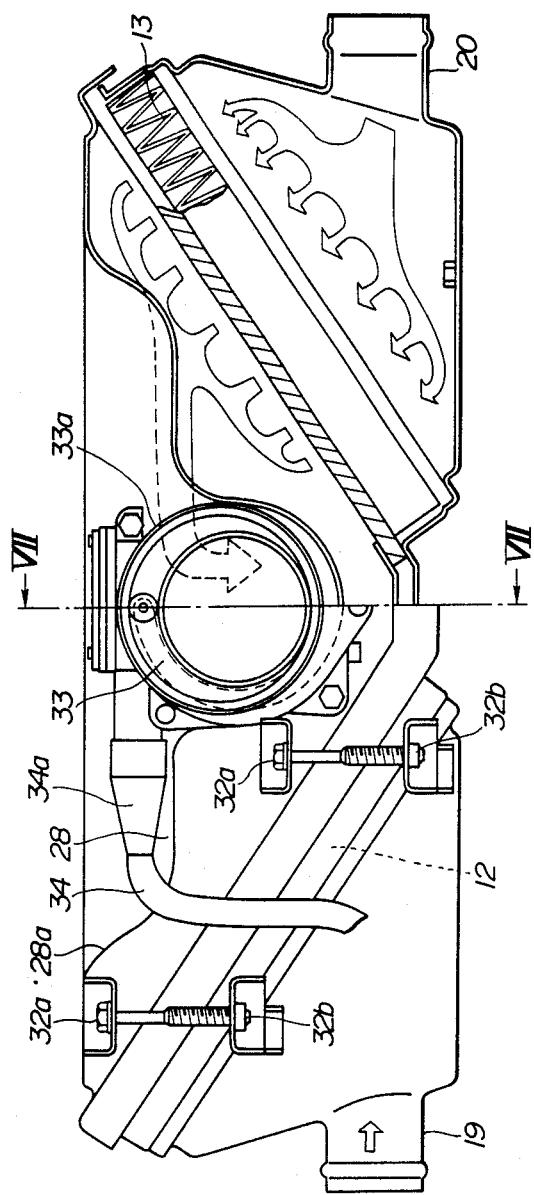
FIG. 6 is a partially cut front view of the air flow meter-mounted air cleaner of FIG. 5.

Referring to FIGS. 5 to 7, there is shown the air cleaner of the first embodiment, on which an air flow meter 33 is operatively mounted. The air flow meter 33 has a tubular portion 33a which is coaxially put in the groove 24 of the cover 11 having an inboard end mated with the air outlet opening 30 of the cover 11. A known probe (not shown) is exposed to the interior of the tubular portion 33a to measure the air flowing therethrough. Denoted by numeral 34a is a plug of a wire harness 34, which is detachably connected to a terminal portion of the probe.

Referring to FIGS. 8 to 12, there is shown an air cleaner of a second embodiment of the present invention. Since the air cleaner of this embodiment is similar to that of the above-described first embodiment, only parts having different constructions will be described in the following, and the similar parts and constructions will be denoted by the same numerals.

Figure 8:
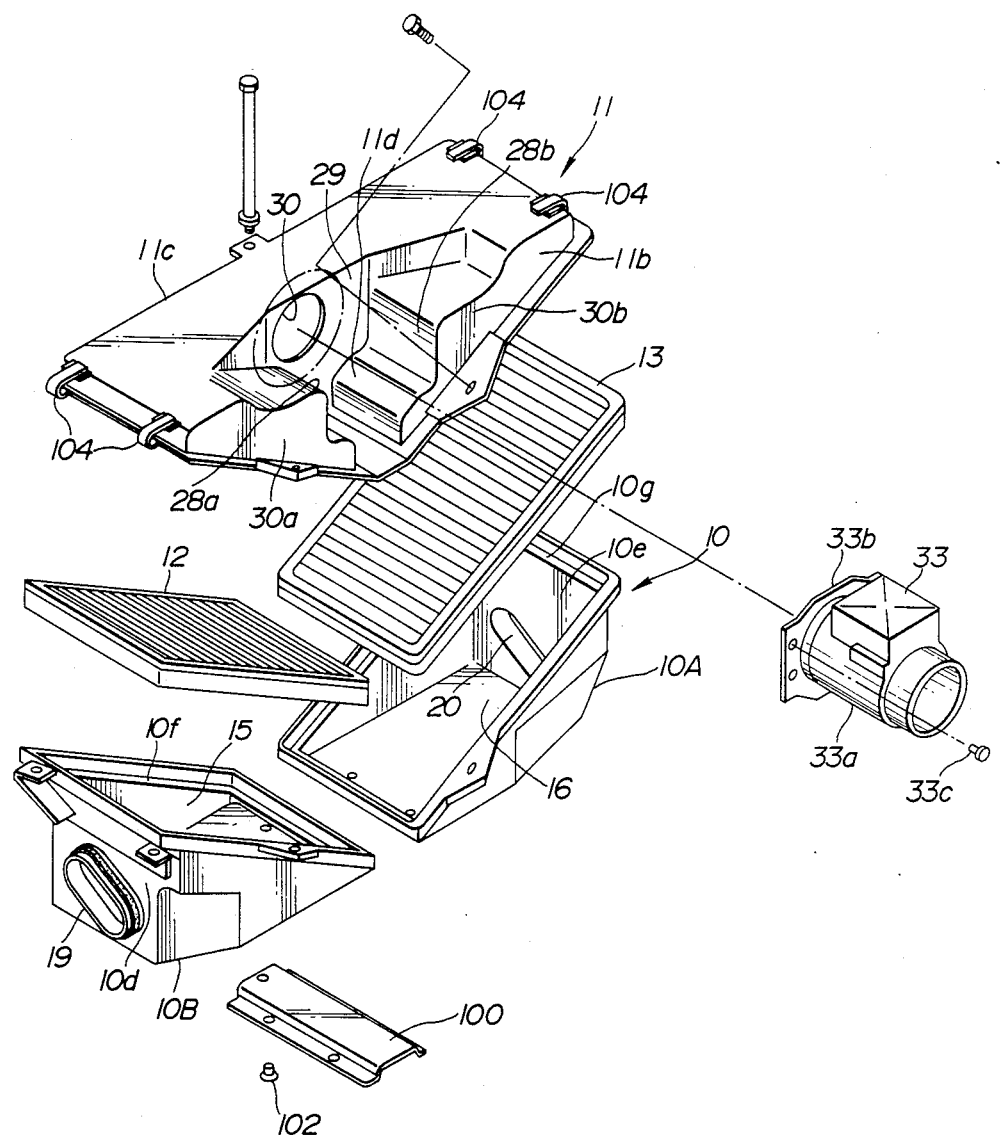
FIG. 8 is a view similar to FIG. 1, but showing an air cleaner of a second embodiment of the present invention with an air flow meter mounted thereon.

As is best seen from FIG. 8, the casing 10 of the second embodiment consists of two identical two major parts 10A and 10B which are combined together with an aid of a connecting metal plate 100. For this connection, suitable numbers of bolts 102 (only one is shown) are used. Unlike the first embodiment, the air inlet pipes 19 and 20 are arranged to extend obliquely on the associated side walls 10d and 10e of the casing 10. A plurality of lugs (no numerals) are integrally connected to the outer peripheral portion of the mouth portion of the casing 10.

The cover 11 of the second embodiment is substantially the same as that of the first embodiment except that in the second embodiment, four clips 104 are used for detachably fixing the cover 11 to the casing 10. That is, for assembly, the cover 11 is put on the casing 10 having the flat paper filter elements 12 and 13 properly set in the casing 10, and then the clips 104 are hooked to the corresponding lugs of the casing 10.

An air flow meter 33 is mounted in the recess 11d of the cover 11 in such a manner that the tubular portion 33a thereof is coaxially connected to the circular outlet opening 30. For this connection, a flange 33b formed on the tubular portion 33a is fixed to the innermost vertical wall 29 of the recess 11d by means of bolts 33c (only one is shown).

In the second embodiment, the following measures are further employed.

Figure 9:
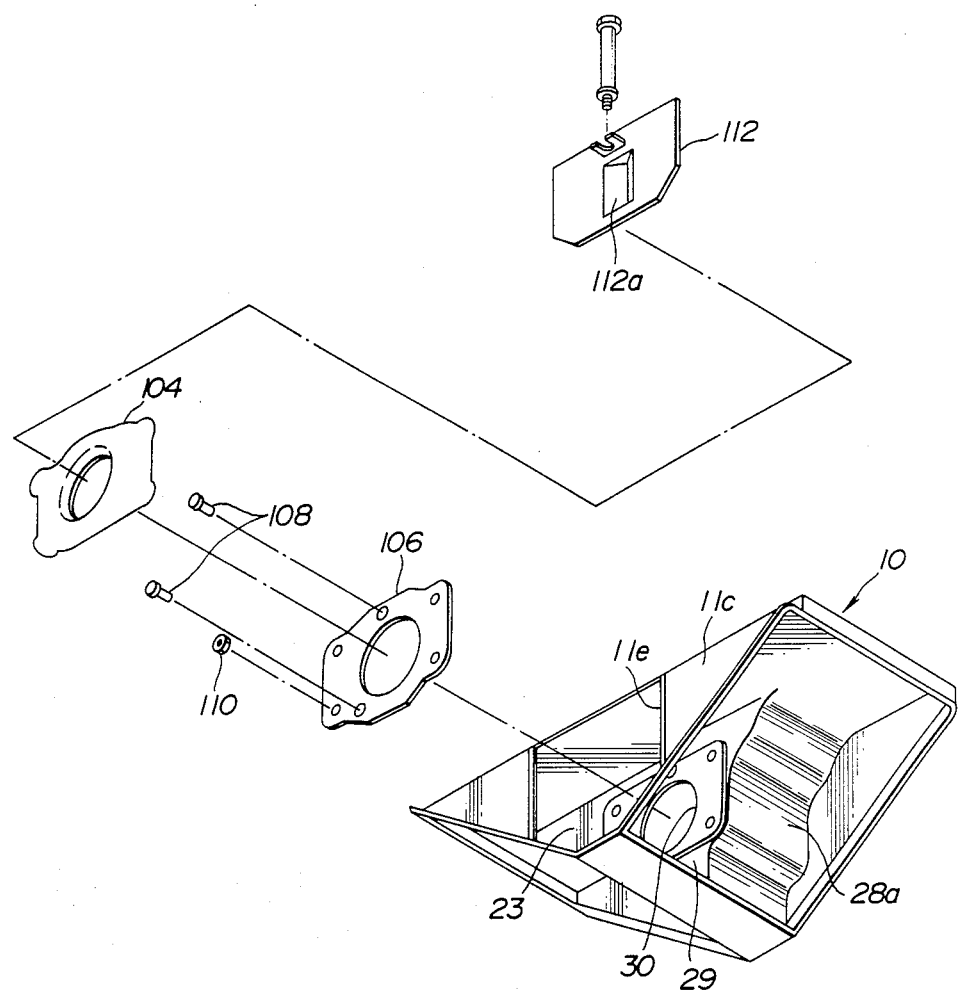
FIG. 9 is an exploded view of some parts employed in the air cleaner of the second embodiment.
Figure 10:
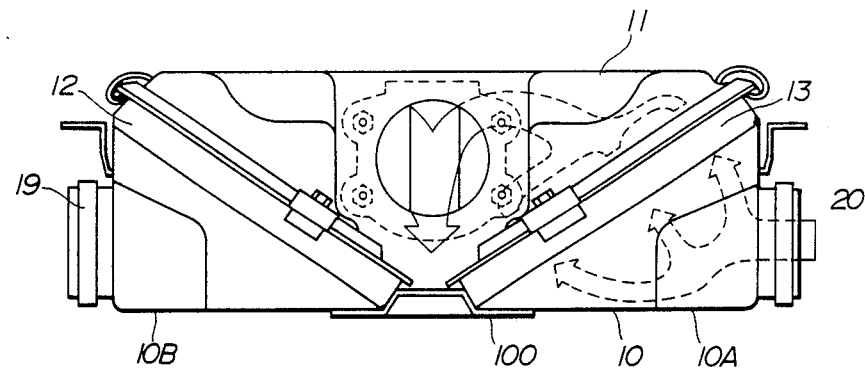
FIG. 10 is a front view of the air cleaner of the second embodiment.
Figure 11:
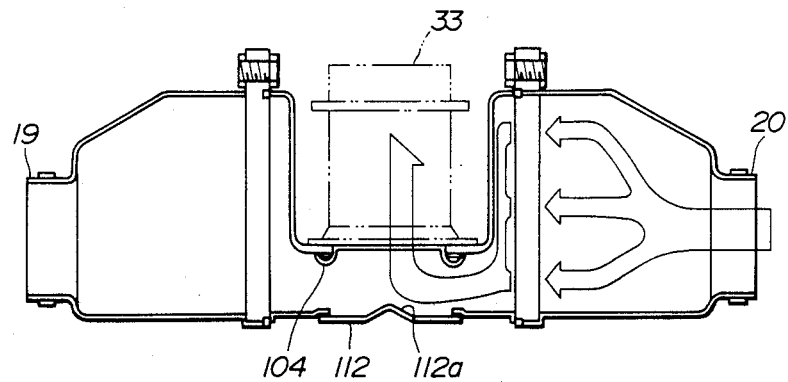
FIG. 11 is a horizontally sectional view of the air cleaner of the second embodiment.
Figure 12:
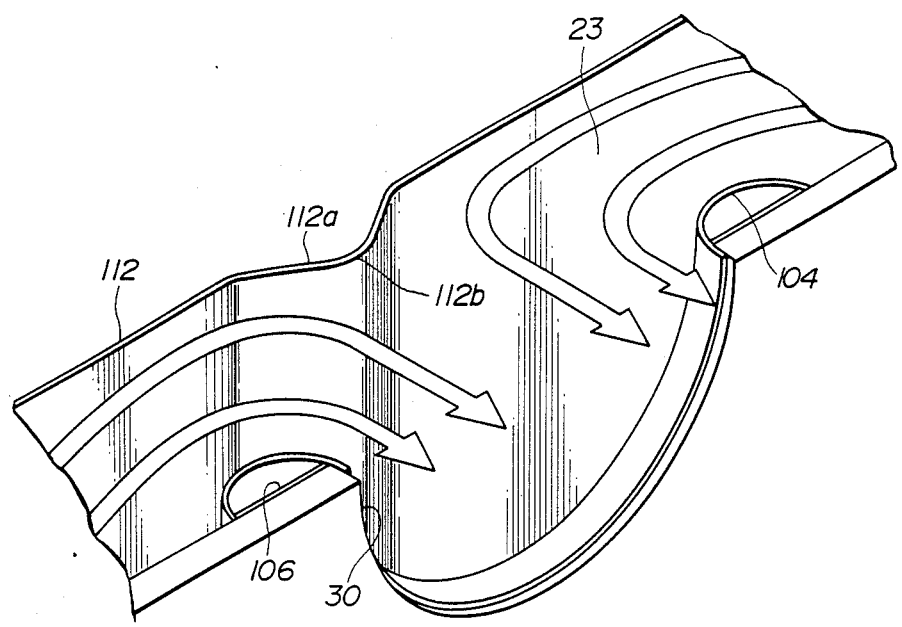
FIG. 12 is an enlarged sectional view of a part of the air cleaner of the second embodiment, showing the manner in which air flows in the air cleaner.
Figure 13:
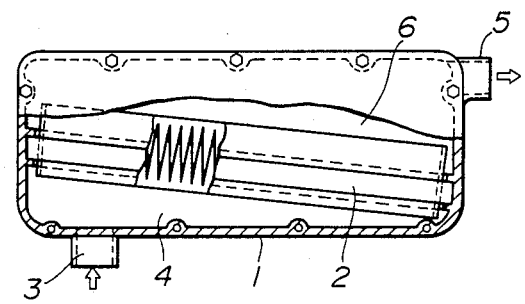
FIG. 13 is a vertically sectional view of a conventional air cleaner.

As is seen from FIG. 9, a bell-mouth member 104 is connected to the outlet opening 30 from the clean side chamber 23 of the cover 11. That is, the bell-mouth member 104 is welded to a flange 106 to constitute a bell-mouth unit, and the unit is connected to an inner face of the vertical wall 29 by means of bolts 108 and nuts 110. Upon assembly, the heads of the bolts 108 are covered by the bell-mouth member 104. For ease of assembling work, the triangular rear wall 11c of the cover 11 is provided with an aperture 11e. As is seen from FIG. 12, the flared part of the bell-mouth member 104 rims the opening 30.

Referring back to FIG. 9, a lid member 112 is detachably connected to the triangular rear wall 11c in a manner to close the aperture 11e. The lid member 112 is formed with a swelled portion 112a which is protruded toward the air outlet opening 30 of the cover 11. That is, as is seen from FIG. 12, the swelled portion 112a comprises two smoothly curved surfaces bounded by a ridge portion 112b. Upon assembly, the ridge portion 112b faces the center of the air outlet opening 30.

In operation, air is introduced into the first and second dust side chambers 15 and 16 through the first and second air inlet pipes 19 and 20. The air is then introduced into the common clean side chamber 23 through the filter elements 12 and 13. The air thus cleaned is then curved by the swelled portion 112a to be directed toward the air outlet opening 30 and discharged therefrom to be fed into an associated engine. It is to be noted that in FIGS. 10, 11 and 12, the manner in which the air flows in the air cleaner is shown by thick arrows.

The air cleaner of the second embodiment has the following advantages.

The first and second advantages of the afore-mentioned first embodiment are commonly possessed by the second embodiment because of their similar constructions.

Because of provision of the swelled portion 112a and the bell-mouth member 104 in the path of air flow, quite smooth air flow is achieved in the air cleaner. That is, as is understood from FIG. 12, the respective streams of air from the air filters 12 and 13 are smoothly curved by the inclined surfaces of the swelled portion 112a to be directed toward the air outlet opening 30 while being rectified by the bell-mouth member 104. Thus, the air flow meter 33 located just downstream of the opening 30 can measure the air flow precisely. As is known, smooth flowing of air in the air cleaner suppresses generation of air vortexes thereby reducing the air flow resistance of the air cleaner.

Because the triangular rear wall 11c of the cover 11 is formed with the aperture 11e, the work for mounting the bell-mouth unit to the air outlet opening 30 of the cover 11 is very facilitated.

What is claimed is:

1. An air cleaner comprising:
   a casing including first and second receptacle portions which are symmetrically arranged with respect to a center portion of the casing, each receptacle portion including an air inlet opening and a holding portion, the holding portions being inclined to one another to form a generally V-shaped recessed portion of the casing;
   first and second filter elements respectively held by the holding portions of said first and second receptacle portions, so that first and second dust side chambers are defined at one side of said first and second filter elements, respectively, in said casing to which the air inlet openings of said first and second receptacle portions are exposed respectively;
   a cover having a protruding portion which overlies the filter elements and the V-shaped recessed portion of the casing and in which an air outlet opening is formed, said cover being sealingly disposed on said casing in such a manner that a common clean side chamber is defined at the other sides of said first and second filter elements, to which said air outlet opening is exposed; and
   structure means defining in said cover two substantially identical flow passages which extend from the respective filter elements to said air outlet opening of the cover.

2. An air cleaner as claimed in claim 1, in which said protruding portion of said cover receives therein an air flow meter.

3. An air cleaner as claimed in claim 1, further comprising fastening means for detachably connecting said cover to said casing.

4. An air cleaner as claimed in claim 1, in which said first and second receptacle portions are arranged symmetrically with respect to said air outlet opening of the cover, and in which said two air flow passages of the cover are arranged symmetrically with respect to said air outlet opening.

5. An air cleaner as claimed in claim 4, in which said cover is formed with a smoothly curved portion which faces said air outlet opening when said cover is properly disposed on the casing.

6. An air cleaner as claimed in claim 5, in which said cover is formed with front and rear walls which extend in the same direction from front and rear edges of a base portion of said cover.

7. An air cleaner as claimed in claim 6, in which said smoothly curved portion is formed on an inner surface of said rear wall of said cover.

8. An air cleaner as claimed in claim 7, in which said smoothly curved portion of said rear wall is defined by a concaved inside surface of the rear wall of the cover.

9. An air cleaner as claimed in claim 7, in which said smoothly curved portion of said rear wall is defined by an inwardly protruded portion formed on said rear wall.

10. An air cleaner as claimed in claim 9, further comprising a bell-mouth member which is coaxially connected to said air outlet opening having its flared part exposed to said inwardly protruded part.

11. An air cleaner as claimed in claim 10, in which said rear part of said cover is formed with a detachable segment on which said inwardly protruded portion is formed.

12. An air cleaner as claimed in claim 7, in which said protruding portion of said cover extends from a middle portion of the base portion to said front wall of the cover.

13. An air cleaner as claimed in claim 12, in which said air outlet opening is formed in a back wall of the protruding portion.

14. An air cleaner as claimed in claim 13, in which each of said front and rear walls of said cover is shaped triangularly, and in which front and rear walls of said casing have respectively triangular recesses with which the triangular front and rear walls of the cover are mated respectively.

15. An air cleaner as claimed in claim 1, in which said first and second filter elements are of an accordian pleated type.

16. An air cleaner as claimed in claim 15, in which said first and second filter elements are arranged V-shape in said casing.

17. An air cleaner comprising:
- a casing including first and second receptacle portions which are symmetrically arranged with respect to a center part of the casing, each receptacle portion including an air inlet opening and a bottom, the receptacle portions being inclined to one another to form a generally V-shaped recessed portion of the casing;
- first and second filter elements respectively held in said first and second receptacle portions in such a manner that first and second dust side chambers are defined at one side of each of said first and second filter elements in said casing, to which dust side chambers said air inlet openings are opened respectively;
- a cover sealingly disposed on said casing in such a manner that a common clean side chamber is defined at the other side of each of said first and second filter elements, said cover being formed with a protruding portion which is shaped to correspond with said V-shaped recessed portion of the casing, said cover being formed with a wall which forms part of said protruding portion, said wall being formed with an air outlet opening which communicates said clean air side chamber with the outside of said air cleaner; and
- air flow passage defining means which defines in said clean side chamber two substantially equal air flow passages which extend from the respective filter elements to said air outlet opening of said cover;
- wherein the axis of each air inlet opening is substantially perpendicular to that of said air outlet opening.

* * * * *